United States Patent [19]
Cohen

[11] Patent Number: 5,287,884
[45] Date of Patent: Feb. 22, 1994

[54] WATER FLOW MONITORING SYSTEM FOR DETERMINING THE PRESENCE OF LEAKS AND STOPPING FLOW IN PLUMBING PIPES

[76] Inventor: Jeffrey D. Cohen, 212 Marian Ct., Hockessin, Del. 19707

[21] Appl. No.: 38,165

[22] Filed: Mar. 26, 1993

Related U.S. Application Data

[63] Continuation-in-part of Ser. No. 918,071, Jul. 24, 1992, abandoned.

[51] Int. Cl.$^5$ .................... E03C 1/00; F16K 37/00
[52] U.S. Cl. .................... 137/486; 137/460; 137/487.5; 137/624.12
[58] Field of Search ........... 137/486, 487.5, 624.12, 137/495, 460

[56] References Cited
U.S. PATENT DOCUMENTS

| | | | |
|---|---|---|---|
| 4,249,565 | 2/1981 | Brust | 137/487.5 X |
| 4,881,948 | 11/1989 | Nakane et al. | 137/460 X |
| 4,911,200 | 3/1990 | Ben-Arie | 137/486 |
| 4,926,901 | 5/1990 | Waltenburg | 137/486 X |
| 5,038,820 | 8/1991 | Ames | 137/486 |
| 5,086,806 | 2/1992 | Engler et al. | 137/486 |

*Primary Examiner*—Gerald A. Michalsky
*Attorney, Agent, or Firm*—Connolly & Hutz

[57] ABSTRACT

A water flow monitoring system for determining the presence of leaks in plumbing pipes having water flowing through the pipes under high pressure includes a flow monitor which is mounted to the pipe for sensing the flow of water through the pipe. A timer and/or accumulated volume meter is associated with the flow monitor to determine when the flow has continued for a preselected period of time, and/or when the amount of water has exceeded a preselected accumulated volume threshold. Upon detection of flow for the preselected period of time, and/or preselected accumulated volume threshold, a valve is actuated to stop flow through the pipe.

25 Claims, 7 Drawing Sheets

WATER FLOW MONITORING SYSTEM FOR DETERMINING THE PRESENCE OF LEAKS AND STOPPING FLOW IN PLUMBING PIPES

CROSS-REFERENCE TO RELATED APPLICATION

This application is a continuation-in-part of application Ser. No. 918,071, filed Jul. 24, 1992, now abandoned.

BACKGROUND OF THE INVENTION

The present invention is directed to preventing unchecked amounts of water from leaking into a home, office, warehouse, building and the like which would otherwise cause damage to the contents of such structure, such as damaging the furniture, clothing, woodwork, artwork and other articles in the structure as well as causing damage to the structure itself. Plumbing systems provide the flow of water under pressure in, for example, a home or other structure. If a leak were to develop in a pipe of the plumbing system while the building is vacant it is possible that such large amounts of water would be released in an uncontrolled manner that severe damage would be caused. Even if a structure is occupied, where a leak occurs which remains undetected for a period of time, the results could also be disastrous.

SUMMARY OF THE INVENTION

An object of this invention is to provide a water flow monitoring system for determining when a leak occurs and upon the determining of such leak to take some action to stop further flow through the leaking plumbing.

A further object of this invention is to provide such a system which upon determination of a leak operates to halt the flow of water through the leaking pipe.

In accordance with this invention a water flow monitoring system is provided which includes flow monitor means mounted to a pipe through which the water flows under high pressure to sense the flow of water through the pipe. Control means having a timer, and/or an accumulated volume meter, is associated with the flow monitor means to determine when the flow has continued for a preselected period of time, and/or continued for a preselected accumulated volume threshold, indicative of unintentional flow or a leak. Action taking means is also included to respond to the detection of the flow for the preselected period of time, and/or the preselected accumulated volume threshold. In the preferred practice of this invention, the action taking means is a valve mounted in the plumbing system to shut off further flow through the system so that leakage is prevented and the prospective damage to the structure and its contents would be held to a much lower level in comparison to an unmonitored leaking water system.

In a variation of the system a second monitor may be provided near the sewer to sense whether the flow of water has continued through the plumbing system to the sewer. If the flow is sensed at both locations then a leak is assumed not present. If, however, the flow continues in the upstream location, but not near the sewer, this would be indicative of a leak in the system. A provision is included in the control means such that sustained water flow detected in both the source and the downstream sewer lines exceeding a period of time or exceeding an accumulated volume level will cause the control means to determine a leak has occurred and therefore stops the water flow.

DETAILED DESCRIPTION

The present invention is directed to a water flow monitoring system for determining the presence of leaks in plumbing pipes. It is to be understood that although the following description will be with respect to water flowing under high pressure through water pipes in a structure, such as a home or building, the invention may be practiced for determining the presence of leakage of any fluid through pipes in any appropriate environment.

Figure 1:
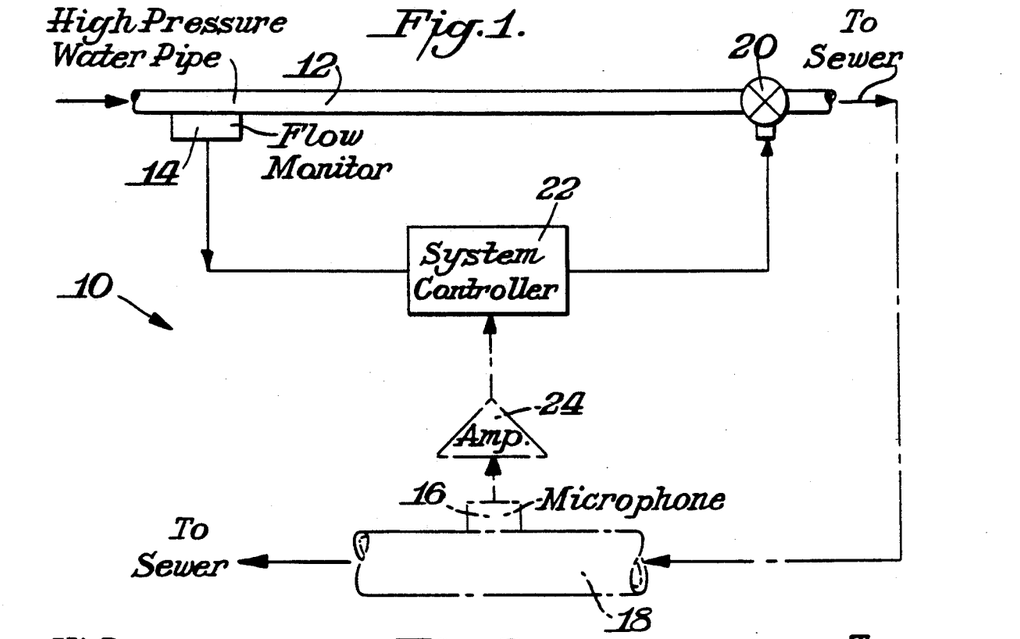
FIG. 1 is a schematic view showing a water flow monitoring system in accordance with this invention.

In general, FIG. 1 illustrates the broad practices of this invention wherein a flow monitoring system 10 is provided which is intended to be used in connection with a high pressure water pipe 12 which eventually leads toward a sewer. System 10 uses a flow monitor means 14 which monitors the water flow through the pressurized water pipe 12. As later described if desired as an option a second flow monitor 16 could be mounted downstream through the drain sewer circuit 18. The invention is intended to take some form of action when it is determined that the water flow has continued beyond a predetermined period of time, and/or when water flow has continued beyond a predetermined accumulated volume threshold, which would indicate abnormal water flow or a leak.

As shown in FIG. 1 system 10 includes the flow monitor 14 mounted to pipe 12 preferably at the downstream of the water supply pipe entry into a structure, such as a home. The flow monitor 14 may be of any suitable construction capable of sensing flow and/or monitoring a flow rate. Examples of suitable flow monitors include a microphone in contact with the water pipe, such as microphone 16. Amplifier 24 would be used to amplify the signal from microphone 16 to controller 22. Alternatively, the flow monitor may take other forms such as an anemometer, a pressure transducer, a rotating paddle wheel, a rotameter, a switch, or any other known suitable flow monitor or detecting means.

Monitor 14 (and monitor 16) indicates or determines the absence or presence of water flow through the portion of the pipe 12 or 18 being monitored. Some form of action taking means, which in the preferred practice of this invention is a mechanized valve 20, is provided in system 10 capable of receiving a signal to close and thereby prevent further flow through pipe 12. The closing of valve 20 would be in response to a signal communicated from the controller, connected in-line with the pressurized water circuit.

In the preferred practice of the invention the valve is an electronically or pneumatically actuated valve. It is to be understood that the invention may be practiced with other types of action taking means such as an audio or visual alarm in addition to or instead of a valve. For example, such alarm might be triggered similar to a burglar alarm at a remote location where the alarm would be sensed and the person sensing the alarm would then know that action must be taken such as going to the dwelling or other structure and manually turning off the water in addition to attempting to determine where the leak has occurred.

In the preferred practice of this invention, the pressurized water flow monitor 14 sends a signal to a controller 22 which times the period of continuous water flow, and/or monitors the accumulated volume of water flow. The controller preferably compares the period of time of continual water flow with a predetermined or preselected period of time considered as a set-point, and/or compares the accumulated volume of water which has flowed during the same period with a predetermined or preselected accumulated volume of water considered as a set-point. The preselected period of time would correspond to the period of time that intentional uninterrupted flow would occur with some safety factor time period added, and/or the preselected accumulated volume threshold of water would correspond to the volume of water that would accumulate during intentional uninterrupted flow with some safety factor accumulated volume added. When the actual period of time indicative of continual water flow reaches the predetermined period of time, and/or when the actual accumulated volume of water indicative of continual water flow reaches the predetermined accumulated volume of water, the controller determines that there is a leak or some abnormal water flow condition. Controller 22 then actuates the action taking means, to respond to the determination of the leak by interrupting water flow or otherwise taking some action as indicated above. Where, for example, a valve 20 is used as the action taking means, the valve 20 remains closed regardless of future input signals from the flow monitor. In order to resume water flow through pipe 12 it is necessary for a manual resetting of the controller 2 and/or valve 20. This manual resetting assures that someone is aware that a leak or abnormal water flow condition has been detected and that the water flow is not resumed until the person determines that it is safe to resume such water flow. As noted, the preselected period of time, and/or the preselected accumulated volume of water, would take into account the longest expected continuous water flow, such as, for example, the amount of flow necessary to fill a bathtub or to operate a washing machine.

The invention takes into account the situation involving continual water flow for a period, and/or accumulated volume, such as a long shower wherein no leak has occurred. In this situation the second flow monitor, such as microphone 16 or other type of flow detection device would be used to monitor the sewer or drain flow. Where monitor 16 is used if the flow of water is detected through the sewer pipe 18 in addition to the upstream portion 12, the signal from monitor 16 would override the signal from monitor 14 and prevent the actuation of valve 20 so that the flow is allowed to continue through the plumbing system. Thus, if the flow of water detected by monitor 14 is also reached at the downstream sewer 18 as detected by monitor 16 then there is no leak and the prolonged water flow is an intended water flow. Where, however, flow is detected through pipe 12 by monitor 14 for a period of time, and/or for an accumulated volume, exceeding the preset period of time, and/or the accumulated volume respectively, and a corresponding flow is not detected by monitor 16 then it is concluded that there must be a leak and valve 20 is actuated.

The controller may be configured such that two different allowable time periods for continuous flow are included. The first allowable time period (T1) for continuous flow is used by the control means as a set point for comparison to the actual continuous flow time period in the case where no flow is detected in the downstream sewer line. The second allowable time period (T2) for continuous flow is used by the control means as a set point for comparison to the actual continuous flow time period in the case where flow is detected in the downstream sewer line. The second time period set point (T2) will be equal to or longer than the first continuous time period set point (T1).

In addition, the controller may be configured such that two different allowable accumulated volume levels during continuous flow are included. The first allowable accumulated volume level during continuous flow (V1) is used by the control means as a set point for comparison to the actual accumulated volume during continuous flow in the case where no flow is detected in the downstream sewer line. The second allowable accumulated volume level during continuous flow (V2) is used by the control means as a set point for comparison to the actual accumulated volume during continuous flow in the case where flow is detected in the downstream sewer line. The second accumulated volume level set point (V2) will be equal to or longer than the first continuous accumulated volume level set point (V1).

The elapsed time of continuous flow and the accumulated volume during continuous flow may be simultaneously monitored by the control means. The control means will actuate the water shut-off device when either the elapsed-time period or the accumulated volume level equal to the respective set point indicative of a leak is reached.

Figure 10:
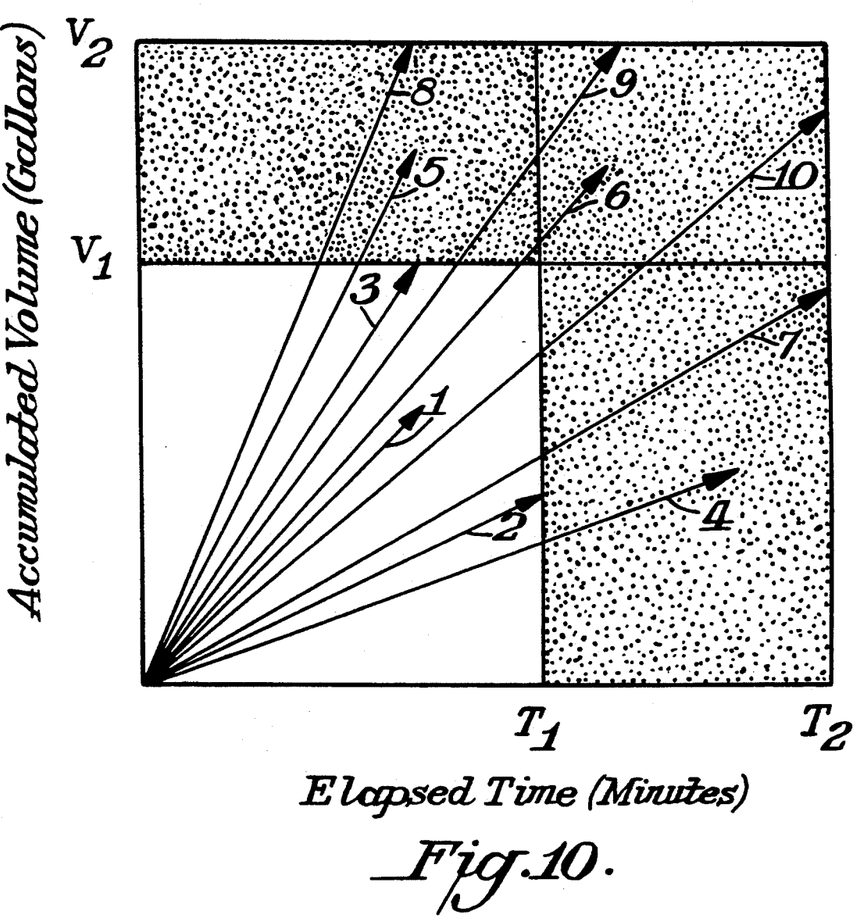
FIG. 10 is a graph of prospective water use histories of various times and flow rates.

Examples of system operation are illustrated in FIG. 10. FIG. 10 shows prospective water use histories of various times and flow rates. Lines which penetrate into the stippled region indicate water use situation when the sewer monitor detects flow and therefore prolongs water use time period or allowable accumulated volume.

The following conditions are illustrated by the individual lines of FIG. 10:

Line 1. Period of water use ended before first time or volume set point was reached. Result: Timer and volume meter reset to zero in preparation for the next water usage.

Line 2. Period of water use reached first time set point and controller sensed no flow in sewer line. Result: Valve was actuated and water flow ceased.

Line 3. Period of water use reached first volume set point and controller sensed no flow in sewer line. Result: Valve was actuated and water flow ceased.

Line 4. Period of water flow use allowed to pass first time set point as controller sensed flow in sewer. Period of water use ended before reaching second time set point. Result: Timer and volume meter reset to zero in preparation for the next water usage.

Line 5. Period of water flow use allowed to pass first volume set point as controller sensed flow in sewer. Period of water use ended before reaching second volume set point. Result: Timer and volume meter reset to zero in preparation for the next water usage.

Line 6. Period of water flow use allowed to pass first volume and time set points as controller sensed flow in sewer. Period of water use ended before reaching second time or volume set point. Result: Timer and volume meter reset to zero in preparation for the next water usage.

Line 7. Period of water flow use allowed to pass first time set point as controller sensed flow in sewer. Period of water use continued and reached second volume set point. Result: Valve was actuated and water flow ceased.

Line 8. Period water flow use allowed to pass first volume set point as controller sensed flow in sewer. Period water use continued and reached second volume set point. Results: Valve was actuated and water flow ceased.

Line 9. Period of water flow use allowed to pass first volume and time set points as controller sensed flow in sewer. Period water use continued and reached second volume set point. Result: Valve was actuated and water flow ceased.

Line 10. Period of water flow use allowed to pass first time and volume set point as controller sensed flow in sewer. Period of water use continued and reached second time set point. Result: Valve was actuated and water flow ceased.

The invention may also be practiced to account for situations where uninterrupted water flow is intended to continue for long periods of time without reaching the sewer pipe. Such situations, for example, might be outdoor use, such as the watering of a lawn or the filling of a pool. In such situations, the invention would be practiced by placing the flow monitoring device downstream in the water circuit where such outdoor flow would not be detected. An alternate control version is to provide a means of overriding the controlling device, remotely at the point of water use, only for the duration of intended water use (e.g. with a switch at the outdoor valve).

Figure 2:
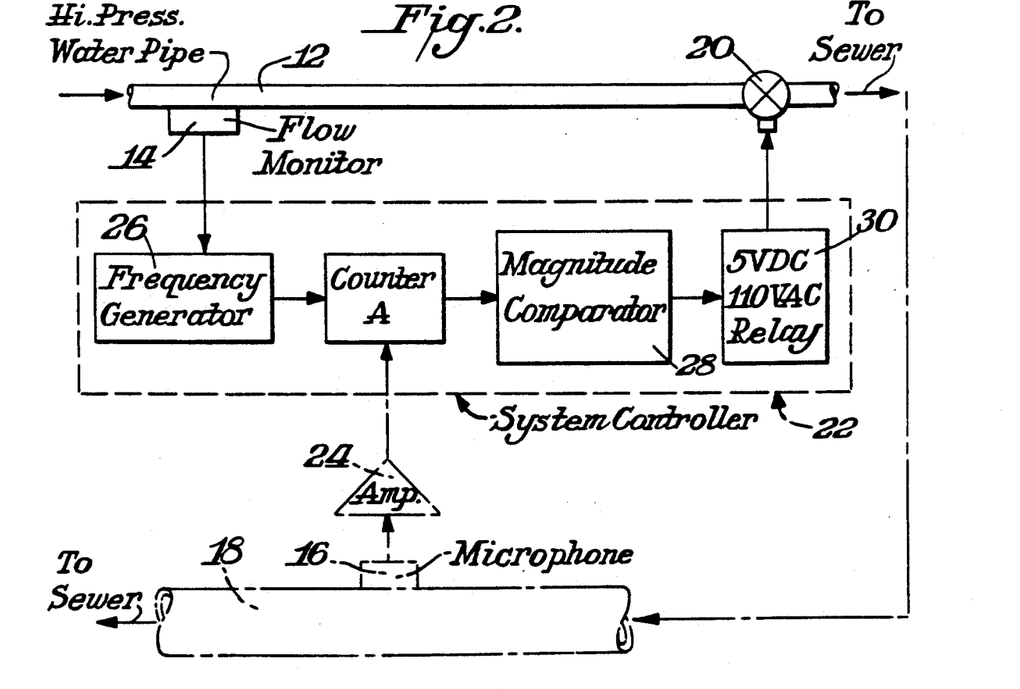
FIG. 2 is a schematic view of a modified water flow monitoring system in accordance with this invention.

FIG. 2 shows in greater detail the operation of flow controller 22. As shown therein, flow controller 22 would include a frequency generator 26 which receives its signal from flow monitor 14. Flow monitor 16 also has its signal amplified by amplifier 24 and the signal is received by counter A which is also receiving the signal from frequency generator 26. Flow monitor 16 acts to signal to the controller that flow has been detected in the sewer at which point the counter resets to zero. A relay 30 would actuate valve 20 upon receiving a signal from comparitor 28 indicative of a leak being determined. Comparitor 28 would, for example, compare the alarm set points to the number of counts it receives. If it is determined that the number of counts from counter A equals or exceeds the set point memory which is indicative of the preselected period of time, and/or preselected accumulated volume of water then a signal is sent to relay 30 for actuating valve 20.

If desired the invention may be practiced by including in the controller a time-of-day, day of week clock to enable changing set points to better match the homeowner's schedule.

Any suitable known techniques could be used for measuring the volume of flow, such as techniques used in gasoline pumps at service stations or techniques used for metering volumes of oil for home oil heating use. Other examples are techniques disclosed in U.S. Pat. Nos. 4,881,948 and 5,086,806.

Figure 3:
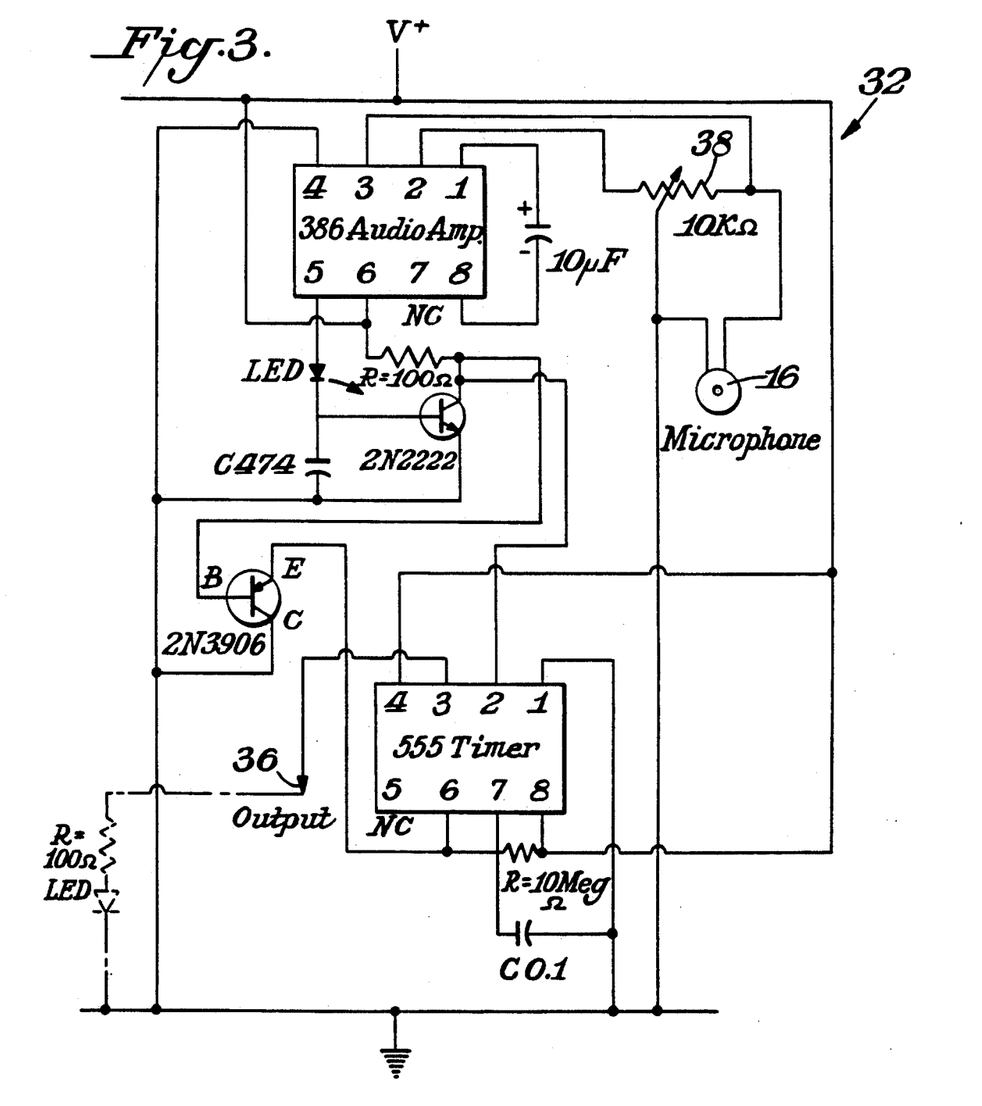
FIG. 3 is a schematic view of the circuit for an amplifier trigger which could be used for external flow monitoring in accordance with this invention.

FIG. 3 illustrates the circuitry 32 for an amplifier trigger that could be used under conditions of external flow monitoring which involves a retriggerable system. The actual output 36 would be normally low. The actual output would be high when for example microphone 16 is excited. The on period would be a function of RxC. The device would be retriggered by sound and would remain on if the sound frequency exceeds RC. As illustrated, the magnitude of the variable resister 38 connected to microphone 16 could be adjusted for desired sound level sensitivity.

Figure 4:
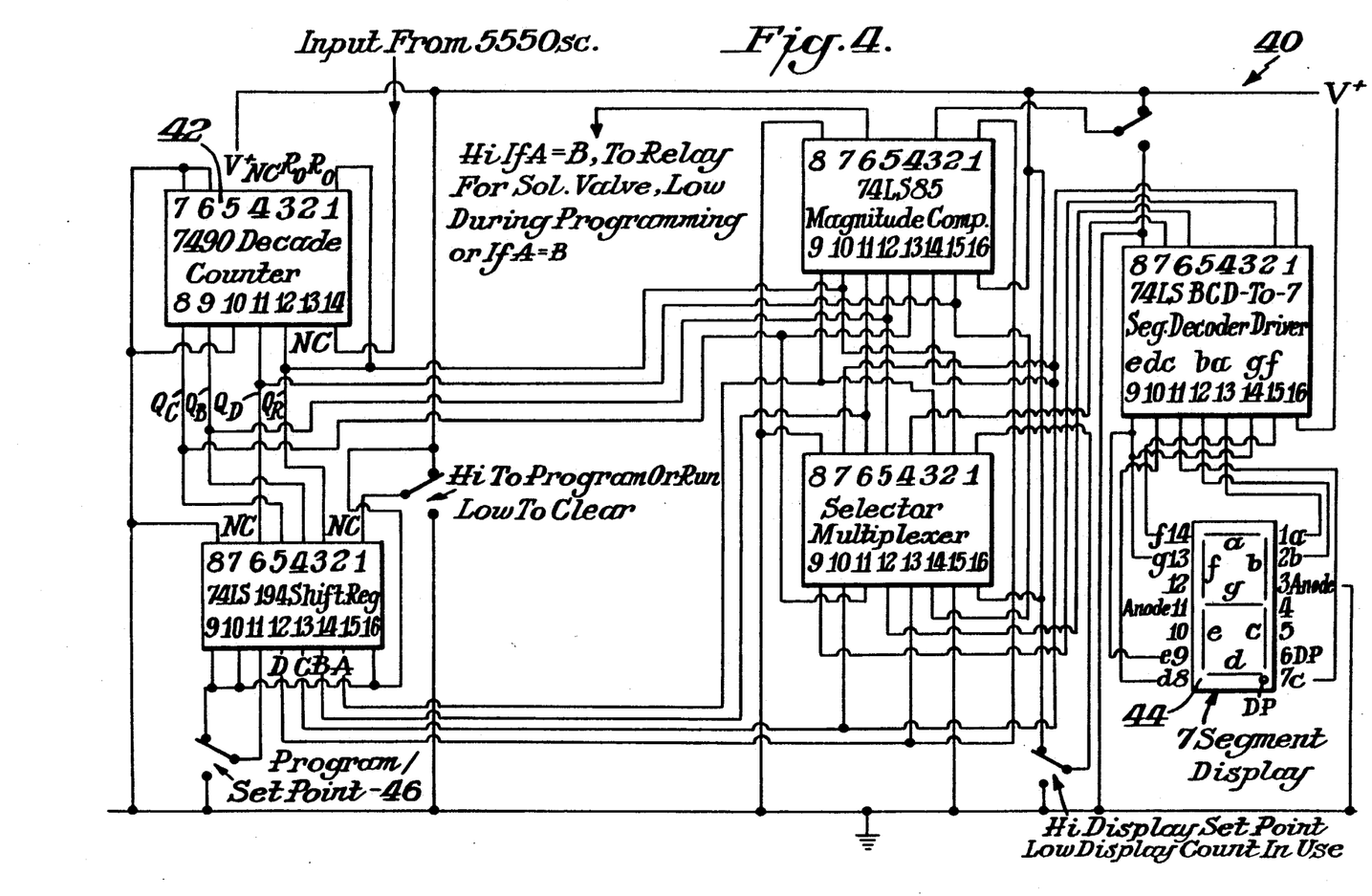
FIG. 4 is a schematic view for the circuit of a counter usable as a timer, with electronically programmed setpoint, in the system of this invention.

FIG. 4 illustrates the circuit 40 for a single decade counter 42 with a programmable alarm with a counting or alarm numerical display 44, for example zero to nine time units such as minutes. The circuit 40 is duplicated for a 0 to 99 dual decade counter with a programmable alarm via magnitude comparitors and shift registers. As indicated by reference numeral 46 the program/set point is accepted when pin 11 goes momentarily from low to high. Pin 11 is normally high to hold the set point.

Figure 5A:
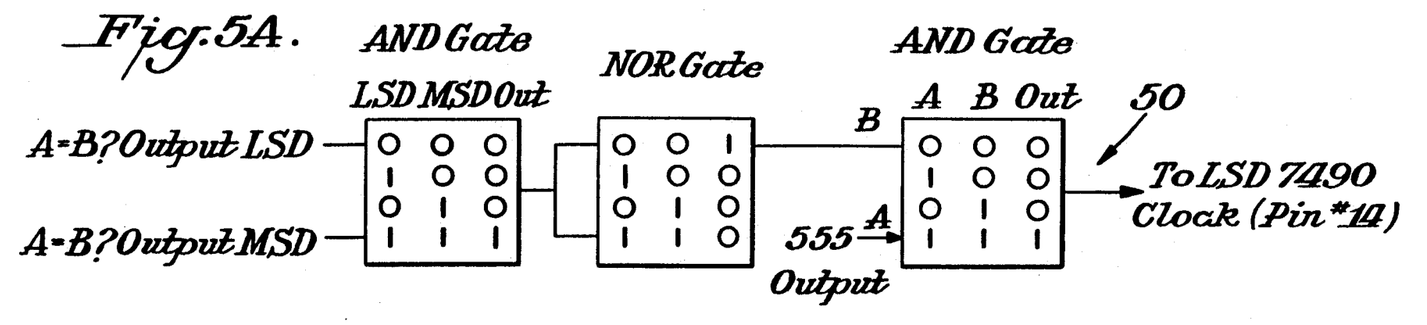
FIG. 5A is a schematic view for the circuit and gates for an alarm/latch usable in the system of this invention.

FIG. 5A illustrates a circuit 50 and gates for an alarm/set point latch enabling the controller 22 of FIGS. 1-2 to remain at a constant count and avoid a reset to zero in the event of an alarm sounding. The circuit 50 also enables the counter to reset to zero each time the water flow ceases prior to reaching the set point.

Figure 5B:
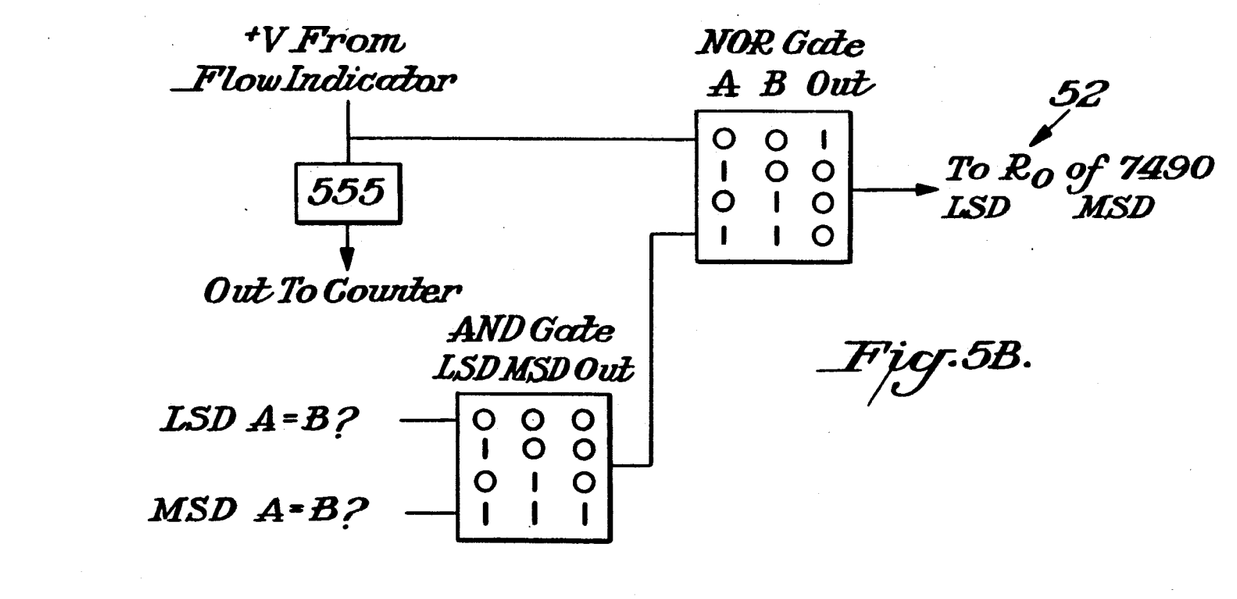
FIG. 5B is a schematic view of a circuit for preventing a reset of the timer in accordance with this invention.

FIG. 5B illustrates a circuit 52 to prevent a resetting to zero in the event the alarm sounds and the flow ceases due to the closure of valve 20. As illustrated, circuit 52 assumes a +V signal during normal water flow.

Figure 6:
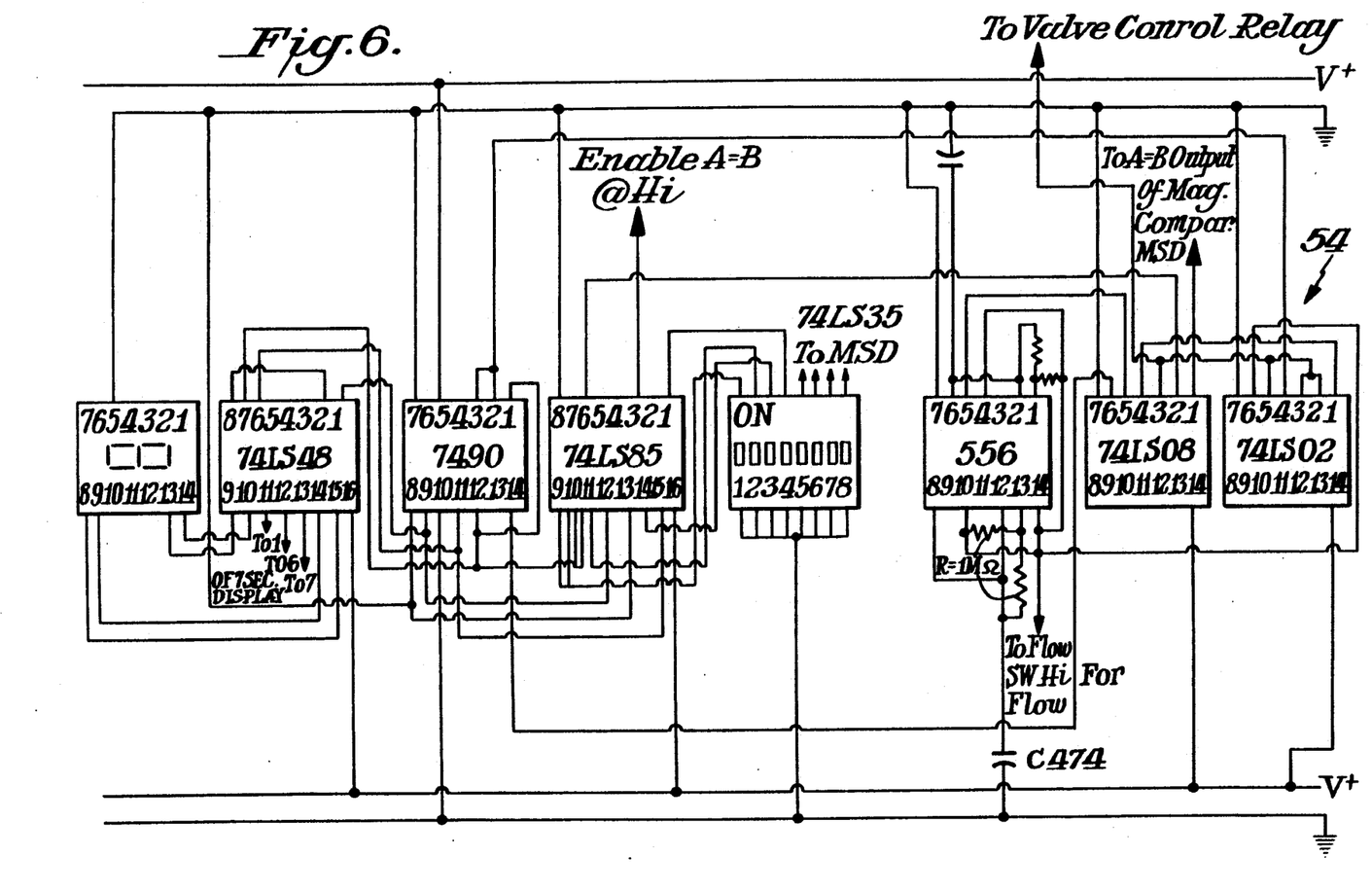
FIG. 6 is a schematic view of a counting circuit with analog set point and alarm latch in accordance with this invention.

FIG. 6 illustrates the least significant digit portion of a counting circuit 54 provided with set point and alarm latch.

Figure 7:
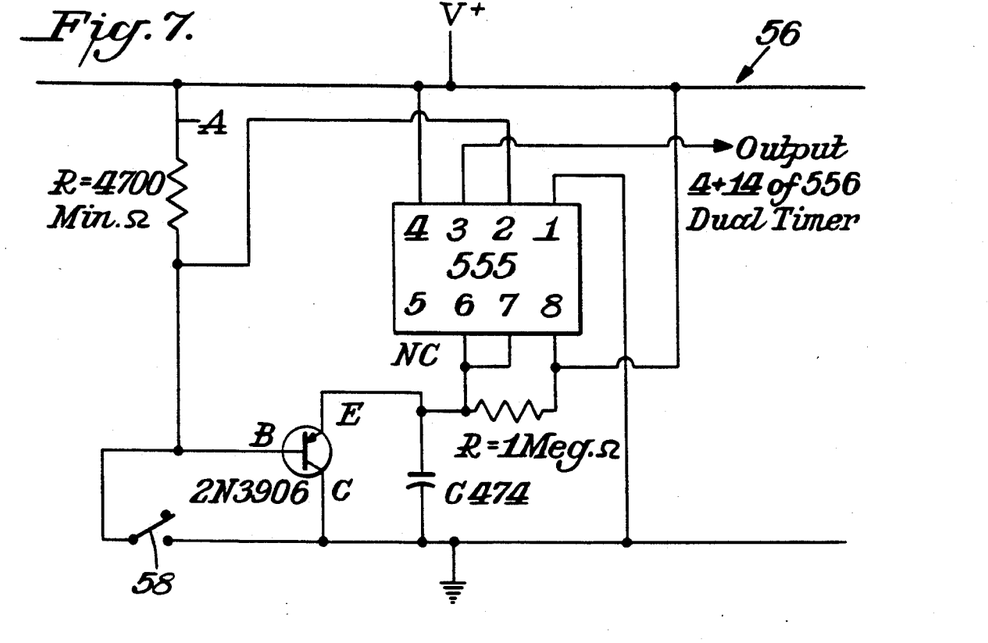
FIG. 7 is a schematic view of the circuit for a retrigerable switch in accordance with this invention.

FIG. 7 illustrates a circuit 56 which includes a retriggerable debounced (switch circuit to ground) switch for being actuated by a single pole single throw switch to ground. As shown therein the flow switch 58 is closed when there is flow and is open during conditions of no flow. Alternatively, a Hall Effect switch 60 as described in connection with FIGS. 8-9 may be used in the circuit.

Figures 8, 9:
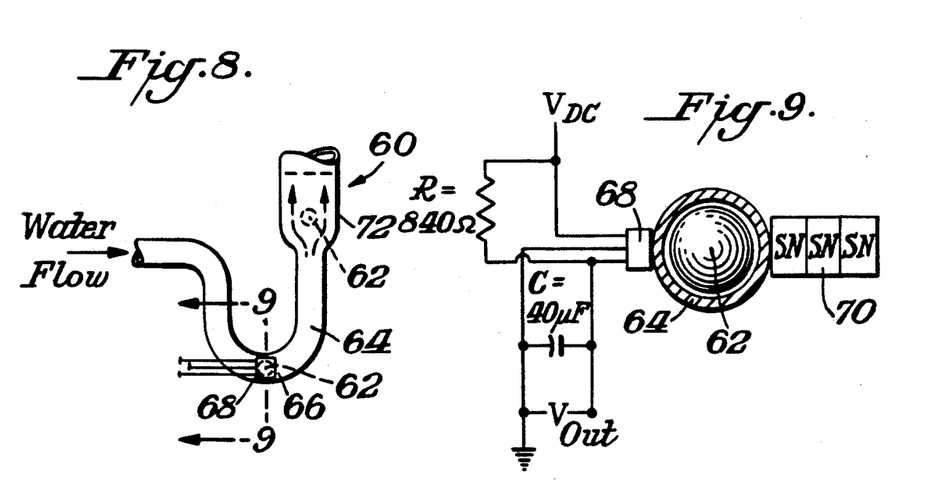
FIG. 8 is an elevation view schematically showing a flow indicating switch in accordance with this invention.
FIG. 9 is a cross-sectional view taken through FIG. 8 along the line 9—9.

FIGS. 8-9 illustrate a form of this invention which utilizes a unique flow indicating switch 60. As shown therein a magnetic flux conducting sphere 62, such as a steel ball bearing would be mounted in the pipe 64 at location 66. As illustrated switch 60 would include a Hall Effect device magnetically activated switch 68. Switch 68 is on one side of pipe 64 and a permanent magnet stack 70 is on the opposite side of pipe 64 with the sphere 62 being therebetween.

In the operation of the switch 60 shown in FIGS. 8-9 sphere 62 would be moved under the drag force of water flow from its upstream location at 66 to a downstream location 72. Location 66 is the bight portion of a U-shaped pipe 64. As illustrated the outer diameter of sphere 62 would be slightly less than the inner diameter of tube 64 so that movement in response to the downstream direction of flow of water permits sphere 62 to move from location 66 to downstream location 72. When the sphere is located at upstream location 66 between device 68 and magnet stack 70 magnetic flux travels through sphere 62 and actuates device 68. The absence of sphere 62 from its upstream location 66 prevents flux from reaching the switch device 68. The strength of the permanent magnetic stack 70 and the various other parameters of switch 60 could be selected so that there is no break in the magnetic flux travel until the water flow has occurred for at least a sufficient rate to dislodge sphere 62 from its upstream position and move sphere 62 sufficiently downstream.

The concepts of FIGS. 8-9 may be practiced with arrangements other than a sphere at the bight portion of a U-shaped pipe. In one variation the pipe would have a portion of lesser diameter than the sphere with a further downstream portion of greater diameter. A seat would be formed at the transition where the sphere is in the flux conducting position. The flux would be broken when the flow rate is sufficient to dislodge the sphere from the seat and force the sphere downstream.

In a still further alternative the pipe would be disposed at a gentle incline with the sphere at a predetermined flux conducting location. The sphere would be forced upwardly to a flux breaking position when the water flow is at a sufficient rate. The angle of incline would determine the force necessary, therefore the flow rate necessary, to move the sphere to its flux breaking position.

As previously described the invention is not intended to be limited to the monitoring of water through the plumbing system of a structure but could be practiced in other manners such as the monitoring of other types of fluid through a pipe and determining leakage. Additionally, it is to be understood that the invention may be practiced for monitoring, for example, water leakage from a pressurized water system due to an opening or leak resulting from water freezing in a pipe. There is a need to have such an automatically acting water shutoff mechanism or alarm in such a pressurized water system in the event that water escapes from a split or open pipe as a result of a temperature drop during a freezing period followed by an increase in temperature.

The automatically acting water system 10 of this invention is also beneficial in its ability to conserve water relative to situations where no such monitoring or control means exists. System 10 would be useful where there are poorly functioning toilet flush arrangements which cause a continual flow of fresh water to occur thereby resulting in the waste of water resources and the increase in water and sewer bills in addition to posing a danger to the building and its contents in the event of toilet overflow in an uncontrolled manner. With system 10, such damage and cost would be greatly reduced and minimized relative to an uncontrolled or unmonitored system without use of the present invention.

To determine if a leak has occurred the leak monitoring system may be used to monitor either, or both, of the following parameters:

1. The period of time (e.g. minutes) of continual water flow, and/or;
2. The accumulated volume (e.g. gallons) during continual water flow. Either, or both of these measured values (measurands) are continually compared to predetermined set-points which have been programmed into the monitoring system controller.

In the event that either of the measurands equal or exceed the predetermined set-points (i.e. time of continual flow and/or accumulated volume of water during continual flow) the controller will activate a shut-off valve to halt water flow.

In the event that a given episode of water flow ends prior to reaching the predetermined time set-point and/or ends prior to reaching the predetermined accumulated volume level, the timer and/or the volume meter will automatically reset to zero time and/or zero volume respectively in preparation to monitor the next period of continual water flow.

What is claimed is:

1. In a fluid flow monitoring system for determining the presence of leaks in plumbing pipes of a plumbing pipe system having fluid flowing therethrough under high pressure, the improvement being in a first flow monitor device mounted to a pipe of the plumbing pipe system for sensing the flow of fluid through the pipe, a second flow monitor device mounted to a pipe of the plumbing pipe system downstream from said first flow monitor device, control means for comparing the continuous flow sensed by said first flow monitor device with the continuous flow sensed by said second flow monitor device, and action taking means actuated by said control means when the continuous flow sensed by said first flow monitor device exceeds the continuous flow sensed by said second flow monitor device.

2. The system of claim 1 wherein said control means actuates said action taking means when the period of time of continuous flow sensed by said first flow monitor device also exceeds a predetermined period of time.

3. The system of claim 1 wherein said system is used for monitoring the accumulated volume of flow.

4. The system of claim 1 wherein said action taking means comprises a valve in a pipe downstream from said first flow monitor device.

5. The system of claim 1 wherein said action taking means includes audio indicating means.

6. The system of claim 1 wherein said first flow monitor device is located immediately downstream from the entry of said pipe into a structure, and said second flow monitor device being located immediately upstream from the sewer.

7. The system of claim 1 wherein said control means includes circuit means having a displaceable member for controlling the activation and inactivation of said circuit, and said displaceable member being displaceable under the pressure of the fluid flow.

8. The system of claim 7 wherein said circuit means includes a Hall Effect switch mounted on one side of one of said pipes, a stack of permanent magnets mounted on the side of said one of said pipes opposite of said Hall Effect switch, and said displaceable member being a magnetic flux conductor.

9. The system of claim 8 wherein said one of said pipes includes a U-shaped section having a bight portion, and said switch and said magnets being located at said pipe, portion.

10. In a fluid flow monitoring system for determining the presence of leaks in plumbing pipes of a plumbing pipe system having fluid flowing therethrough under pressure, the improvement being in a first flow monitor device mounted to a pipe of the plumbing pipe system for sensing the flow of fluid through the pipe, a second flow monitor device mounted to a pipe of the plumbing pipe system downstream from said first flow monitor device, control means including a counter and a comparitor, said counter receiving signals from said first flow monitor device in accordance with the flow sensed by said first flow monitor device, said comparitor comparing the count of signals received from said first flow monitor device with a pre-set point to actuate action taking means when the count of signals from said counter exceeds said pre-set point, and said second flow monitor device resetting said counter to zero when said second flow monitor device senses flow of fluid through its pipe.

11. The system of claim 10 wherein said control means resets said counter to zero when said first flow monitor device ceases to detect flow of fluid.

12. The system of claim 10 wherein each of said first flow monitor device and said second flow monitor device is a microphone.

13. The system of claim 10 wherein said action taking means comprises a valve in a pipe downstream from said first flow monitor device.

14. The system of claim 13 wherein said action taking means includes audio indicating means.

15. The system of claim 13 wherein said first flow monitor device is located immediately downstream from the entry of said pipe into a structure.

16. The system of claim 10 wherein said action taking means includes audio indicating means.

17. The system of claim 10 wherein said control means includes circuit means having a displaceable member for controlling the activation and inactivation of said action taking means, and said displaceable member being displaceable under the pressure of the fluid flow.

18. The system of claim 17 wherein said circuit means includes a Hall Effect switch mounted on one side of one of said pipes, a stack of permanent magnets mounted on the side of said one of said pipes opposite of said Hall Effect switch, and said displaceable member being a magnetic flux conducting sphere.

19. The system of claim 18 wherein said one of said pipes includes a U-shaped section having a bight portion, and said switch and said magnets being located at said bight portion.

20. In a fluid flow monitoring system for determining the presence of leaks in plumbing pipes of a plumbing pipe system having fluid flowing therethrough under high pressure, the improvement being in a first flow monitor device mounted to a pipe of the plumbing pipe system for sensing the flow of fluid through the pipe, a second flow monitor device mounted to a pipe of the plumbing pipe system downstream from said first flow monitor device, control means for comparing the continuous flow sensed by said first flow monitor device with the continuous flow sensed by said second flow monitor device, action taking means actuated by said control means when the continuous flow sensed by said first flow monitor device exceeds a predetermined continuous flow, said control means having two set points for determining when the predetermined continuous flow is reached, said two set points comprising a first set point and a second set point of higher magnitude flow parameter than said first set point, said predetermined continuous flow being reached upon selectively a first condition and a second condition, said first condition being the reaching of the first set point by said first flow monitor device when no flow is detected by said second flow monitor device, and said second condition being when flow is detected by said second flow monitor and said second set point is reached by said first flow monitor with said control means overriding said first set point.

21. The system of claim 20 wherein said flow parameter is a time period.

22. The system of claim 21 wherein said action taking means is a valve for shutting off flow of the fluid.

23. The system of claim 20 wherein said flow parameter is a volume of flow.

24. The system of claim 23 wherein said action taking means is a valve for shutting off flow of the fluid.

25. The system of claim 23 including a second set of first and second set points related to time period flow parameters and said monitor devices and control means simultaneously monitoring both the volume and time of flow.

* * * * *